US010742135B2

(12) United States Patent
Göpfrich et al.

(10) Patent No.: US 10,742,135 B2
(45) Date of Patent: Aug. 11, 2020

(54) ENERGY RECOVERY RECTIFIER DEVICE

(71) Applicant: SIEMENS AKTIENGESELLSCHAFT, Munich (DE)

(72) Inventors: Kurt Göpfrich, Bamberg (DE); Hubert Schierling, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/083,379

(22) PCT Filed: Feb. 2, 2017

(86) PCT No.: PCT/EP2017/052240
§ 371 (c)(1),
(2) Date: Sep. 7, 2018

(87) PCT Pub. No.: WO2017/153096
PCT Pub. Date: Sep. 14, 2017

(65) Prior Publication Data
US 2019/0115847 A1 Apr. 18, 2019

(30) Foreign Application Priority Data
Mar. 8, 2016 (EP) .................................. 16159163

(51) Int. Cl.
H02M 7/00 (2006.01)
H02M 7/219 (2006.01)
(Continued)

(52) U.S. Cl.
CPC ........... *H02M 7/219* (2013.01); *H02M 7/217* (2013.01); *H02M 1/12* (2013.01); *H02M 3/158* (2013.01);
(Continued)

(58) Field of Classification Search
CPC ...... H02M 7/219; H02M 3/158; H02M 7/217; H02M 1/12; H02M 5/4585; H02M 7/537; H02M 2001/007
See application file for complete search history.

(56) References Cited

U.S. PATENT DOCUMENTS 6,850,424 B2   2/2005  Schierling et al.
6,862,163 B2   3/2005  Schierling et al.
(Continued)

FOREIGN PATENT DOCUMENTS

CN        1383605 A       12/2002
DE    102011078304 A1      1/2013
(Continued)

OTHER PUBLICATIONS

International Search Report issued by the European Patent Office in International Application PCT/EP2017/052240.
(Continued)

*Primary Examiner* — Adolf D Berhane
*Assistant Examiner* — Afework S Demisse
(74) *Attorney, Agent, or Firm* — Henry M. Feiereisen LLC

(57) ABSTRACT

The invention relates to an energy recovery rectifier device (16), in particular for an industrial plant (2), for connection to an AC system (8), comprising an energy recovery rectifier (24) and a buffer capacitor (46) that is connected in parallel to the DC side (30) of the energy recovery rectifier (24). A step-up converter (52) is connected between the buffer capacitor (46) and the energy recovery rectifier (24). The invention further relates to a method (86) for operating an energy recovery rectifier device (16) as well as to an industrial plant (2) comprising an energy recovery rectifier device (16).

12 Claims, 4 Drawing Sheets

(51) Int. Cl.
*H02M 7/217* (2006.01)
*H02M 5/458* (2006.01)
*H02M 1/00* (2006.01)
*H02M 1/12* (2006.01)
*H02M 7/537* (2006.01)
*H02M 3/158* (2006.01)

(52) U.S. Cl.
CPC .......... *H02M 5/4585* (2013.01); *H02M 7/537* (2013.01); *H02M 2001/007* (2013.01)

(56) References Cited

U.S. PATENT DOCUMENTS

| | | |
|---|---|---|
| 6,914,397 B2 | 7/2005 | Schierling |
| 7,026,783 B2 | 4/2006 | Eckardt |
| 7,301,736 B2 | 11/2007 | Schierling |
| 7,394,627 B2 | 7/2008 | Schierling et al. |
| 7,489,124 B2 | 2/2009 | Schierling |
| 7,529,111 B2 | 5/2009 | Schierling |
| 7,622,886 B2 | 11/2009 | Schierling |
| 7,652,585 B2 | 1/2010 | Schierling |
| 7,825,533 B2 | 11/2010 | Schierling |
| 9,318,969 B2 | 4/2016 | Dillig et al. |
| 2002/0054499 A1 | 5/2002 | Tanaka et al. |
| 2005/0122747 A1 | 6/2005 | Gaksch |
| 2005/0226017 A1* | 10/2005 | Kotsopoulos ..... H02M 7/53873 363/125 |
| 2007/0053213 A1* | 3/2007 | Brune ................. H02M 5/4585 363/37 |
| 2008/0310202 A1 | 12/2008 | Schierling |
| 2010/0259955 A1 | 10/2010 | Shimada |
| 2011/0043082 A1 | 2/2011 | Schierling et al. |
| 2014/0055033 A1 | 2/2014 | Yao |
| 2015/0280601 A1* | 10/2015 | Sakakibara ............ H02M 1/15 363/37 |

FOREIGN PATENT DOCUMENTS

| | | |
|---|---|---|
| EP | 1760870 A2 | 3/2007 |
| EP | 2680421 A1 | 1/2014 |

OTHER PUBLICATIONS

U.S. Pat. No. 6,760,239, Jul. 6, 2004, 2003202369, Oct. 30, 2003, Schierling et al.
U.S. Pat. No. 9,509,234, Nov. 29, 2016, 2014-0369091, Dec. 18, 2014, Schierling et al.
U.S. Pat. No. 8,743,572, Jun. 3, 2014, 2011/0187480, Aug. 4, 2011, Schierling et al.
U.S. Pat. No. 9,146,166, Sep. 29, 2015, 2014/0026681, Jan. 30, 2014, Schierling et al.
U.S. Pat. No. 9,859,820, Jan. 2, 2018, 2015-0365021-A1, Dec. 17, 2015, Schierling.
U.S. Pat. No. 9,595,883, Mar. 14, 2017, 2016-0268920-A1, Sep. 15, 2016, Schierling et al.

* cited by examiner

ENERGY RECOVERY RECTIFIER DEVICE

CROSS-REFERENCES TO RELATED APPLICATIONS

This application is the U.S. National Stage of International Application No. PCT/EP2017/052240, filed Feb. 2, 2017, which designated the United States and has been published as International Publication No. WO 2017/153096 and which claims the priority of European Patent Application, Serial No. 16159163.1, filed Mar. 8, 2016, pursuant to 35 U.S.C. 119(a)-(d).

BACKGROUND OF THE INVENTION

The invention relates to an energy recovery rectifier device for connection to an AC (alternating current) system. The energy recovery rectifier device comprises an energy recovery rectifier and is in particular a constituent part of an industrial plant. The invention further relates to a method for operating an energy recovery rectifier device and to an industrial plant comprising an energy recovery rectifier device.

Industrial plants typically have a plurality of drives, each of which comprises an electric motor. In such an arrangement, the motor is supplied with electrical power by means of a power converter comprising a rectifier, a DC (direct current) link and an inverter. The inverter is operated in electrical contact with the electric motor and serves to adjust the rotational speed and power output of the electric motor. The rectifier, in contrast, is connected to an AC system or network that has three phases, each of which conducts an alternating current, the individual phases typically being offset from one another by 120°. In the simplest embodiment, the rectifier comprises six diodes that are contacted to one another in an arrangement known as a bridge circuit. Connected in parallel with the rectifier side of the bridge circuit is a DC link capacitor by means of which the DC link voltage present between the rectifier and the inverter is intended to be stabilized.

During operation of the industrial plant there occur time windows within which the electric motor is required to be braked. In order to ensure a comparatively efficient operation of the industrial plant, the electric motor is in this case operated in a generator mode and consequently rotational energy is converted into electrical energy. The DC link capacitor is fed by means of said energy. In a development, the rectifier is embodied with energy recovery capability, such that the recovered electrical energy is fed back again into the AC system and as a result is available to other electricity-consuming loads of the AC system. This enables the DC link capacitor to be dimensioned into a smaller physical size.

In order to embody the rectifier with energy recovery capability, the diodes are bridged by means of semiconductor switches, which are therefore connected in parallel therewith. The electrical current is fed into that phase of the three phases of the AC system that has the highest voltage in order to enable the greatest possible transfer of energy. As a result, a comparatively large electrical current is switched at the time at which a switchover (commutation) takes place from one phase to another phase. A formation of undesirable oscillations within the fed-back current is also possible due to the comparatively abrupt switching and due to any inductances that may be present.

The object underlying the invention is to disclose a particularly suitable energy recovery rectifier device as well as a particularly suitable method for operating an energy recovery rectifier device, and also a particularly suitable industrial plant comprising an energy recovery rectifier device, wherein a formation of oscillations within the fed-back current during operation is preferably reduced.

SUMMARY OF THE INVENTION

According to one aspect of the present invention, the object is achieved by an energy recovery rectifier device, in particular for an industrial plant, for connection to an AC system, including an energy recovery rectifier and a buffer capacitor that is connected in parallel with the DC side of the energy recovery rectifier, wherein a step-up converter is connected between the buffer capacitor and the energy recovery rectifier.

According to another aspect of the present invention, the object is achieved by a method for operating an enemy recovery rectifier device, in particular for an industrial plant, for connection to an AC system, which enemy recovery rectifier device includes an enemy recovery rectifier and a buffer capacitor that is connected in parallel with the DC side of the enemy recovery rectifier, wherein an electrical current flow between the energy recovery rectifier and the buffer capacitor (46) is reduced at the time of a commutation.

According to still another aspect of the present invention, the object is achieved by an industrial plant including an enemy recovery rectifier device as set forth above and/or which is operated by a method as set forth above, and which has a power output between 5 kW and 250 kW, in particular between 10 kW and 200 kW.

Advantageous developments and embodiments are the subject matter of the respective dependent claims.

The energy recovery rectifier device is preferably a constituent part of an industrial plant and has, for example, a power output rating between 5 kW and 20 kW, and preferably greater than 10 kW. The energy recovery rectifier device is suitable, beneficially provided and configured for connection to an AC system, the AC system in particular being embodied as a two- or three-phase network. The AC system beneficially comprises three phases offset from one another by 120°, each of the phases having a sinusoidal electrical current waveform. The frequency is 50 Hz or 60 Hz, for example. Preferably, each of the three phases has a sinusoidal electrical AC voltage at the same frequency, the amplitude beneficially being 325 V. In particular, the energy recovery rectifier device is used within an industrial plant.

The energy recovery inverter device comprises an energy recovery rectifier, the latter having a DC side and an AC side. In the installed state, the AC side is in electrical contact with the AC system. A bridge circuit, for example a B4 or B6 circuit, is preferably arranged between the DC side and the AC side. Each of the bridge branches of the bridge circuit preferably has a diode with which a switching element (rectifier switching element), which is preferably a semiconductor switch/power semiconductor switch, is connected in parallel. It is beneficial to combine the diode and the semiconductor switch in a single module. Each of the bridge branches suitably has an IGBT module or a MOSFET as the rectifier switching element.

The energy recovery rectifier device further comprises a buffer capacitor, which is connected in parallel with the DC side. A step-up converter is connected between the buffer capacitor and the energy recovery rectifier. The step-up converter is a DC to DC converter by means of which an electrical DC voltage is transformed into a further, increased electrical DC voltage. During operation, the buffer capacitor consequently has a DC link voltage that is increased compared to an output voltage that is present on the rectifier side. For example, the energy recovery rectifier comprises a DC link capacitor on the DC side, i.e. a further capacitor at which the output voltage is present. Said capacitor is in particular embodied as comparatively small, at least smaller than the buffer capacitor. In particular, there is formed, by means of the buffer capacitor and the step-up converter, a DC link which during operation has a substantially constant DC link voltage and therefore comprises two branches, one of which is positive and the remaining one negative. In this case the positive branch has a greater electrical potential compared to the negative branch. As a minimum, however, the DC link comprises the buffer capacitor and the step-up converter.

Owing to the increased electrical DC link voltage present at the buffer capacitor, it is made possible to set an electrical current flow between the buffer capacitor and the AC system, with no requirement for an inductor. As a result, given a suitable means of control, a formation of oscillations in the fed-back current can be avoided or at least reduced.

The step-up converter is beneficially assigned to the positive branch, such that the electrical potential of the positive branch is increased by means of the step-up converter. The negative branch of the DC link is preferably electrically contacted to the AC system by means of the diodes of the energy recovery rectifier, the (energy recovery) rectifier being conducted for example on its AC side capacitively to ground, in particular earth. Consequently, the negative branch of the DC link is conducted substantially to ground, thus leading to a basic interference suppression and as a result to an increase in electromagnetic compatibility. Leakage currents are also conducted to ground in this way.

Preferably, the energy recovery rectifier is provided and realized as a module, in particular as what is known as a voltage source inverter having a slimline DC link. This module comprises for example the DC link capacitor, insofar as this is present. Preferably, a further module is maintained in electrical contact with said module, which further module comprises the buffer capacitor and the step-up converter, and which consequently—with the exception of the DC link capacitor of the energy recovery rectifier, if present—substantially forms the DC link. In this way a modular production of the energy recovery rectifier device is made possible, thereby reducing manufacturing costs. It is furthermore rendered possible to make use of any already existing modules.

For example, the buffer capacitor comprises a capacitor element, for example an electrolytic capacitor. Preferably, the buffer capacitor comprises an electrical circuit for precharging the capacitor element, by means of which circuit the capacitor element is precharged at the commencement of operation of the energy recovery inverter device. For example, the electrical voltage present at the capacitor element is maintained in a standby mode in this case. In this way a change of operating mode of the energy recovery inverter device is made possible substantially without delay, a precharging of the buffer capacitor by way of the energy recovery rectifier being unnecessary. Accordingly, the buffer capacitor can have a comparatively large capacitance, the energy recovery rectifier device nonetheless operating substantially instantaneously.

Preferably, a first controllable switching element is connected between the buffer capacitor and the DC side. In this case the interconnection arrangement is preferably such that an electrical current flow from the rectifier side to the buffer capacitor and from the buffer capacitor to the DC side can be controlled by means of the first controllable switching element. The first controllable switching element is for example a component of the step-up converter and/or of the positive branch. In particular, the first controllable switching element is a semiconductor switching element/power semiconductor switch, and for example an IGBT or a MOSFET, in particular a SIC MOSFET. The first controllable switching element is preferably embodied as bidirectional. To sum up, the first controllable switching element is a bidirectional switch, the first controllable switching element being provided for example by means of a transistor, preferably connected in parallel with which is a diode by means of which a constant current flow is made possible from the rectifier side to the buffer capacitor. In this case the electrical voltage is preferably stepped up by means of the step-up converter, such that the output voltage present at the rectifier side, for example, or the DC link voltage increased compared thereto flows via the diode of the first controllable switching element.

In particular, the first controllable switching element is operated at a pulse frequency, the maximum switching frequency being for example greater than 10 kHz and preferably between 20 kHz and 150 kHz. Alternatively, or particularly preferably in combination herewith, the rectifier switching elements of the energy recovery rectifier are operated at the system frequency. It is consequently made possible to optimize the rectifier switching elements of the energy recovery rectifier for comparatively low electrical conducting state power losses. The first controllable switching element, on the other hand, is particularly preferably optimized for low switching losses, thereby achieving an increase in efficiency of the energy recovery rectifier device.

Owing to a means of control of said type, the output voltage of the energy recovery rectifier present at the rectifier side also changes substantially only at the system frequency, the amplitude of the change being reduced. To sum up, an electrical current flow between the buffer capacitor and the energy recovery rectifier is set by means of the first controllable switching element, this being possible substantially independently of the current phase angle of the electrical current of the respective phase due to the increased DC link voltage.

To sum up, given suitable control of the rectifier switching elements of the energy recovery rectifier, which are operated in particular at the system frequency, system oscillations are avoided by means of the first controllable switching element and by means of the step-up converter, since no further inductances are present. A DC link voltage/output voltage also changes only at three times the system frequency to ground, insofar as the negative branches of the DC link are conducted to earth, for example capacitively, by means of the diodes of the energy recovery rectifier. Leakage currents to ground are reduced as a result. A controller is utilized for adjusting the current flow, for example. In other words, the first controllable switching element is controlled by means of a controller, in particular by means of a PI controller.

The step-up converter comprises a boost converter, for example, one of the branches of the DC link preferably comprising an inductor. In particular, the positive branch has the inductor, which is in the form of a coil or choke, for example, and which is connected in series in particular with a diode. For example, the diode and the inductor are bridged by means of a further diode and a variable resistor, which is adjustable, for example. The two branches themselves are short-circuitable by means of a second controllable switching element. The second controllable switching element is preferably a semiconductor switching element, in particular a power semiconductor switch, such as a field effect transistor, in particular a MOSFET or an IGBT. The second controllable switching element is suitably of identical design to the first controllable switching element, insofar as this is present.

During operation, the two branches of the DC link are short-circuited by means of closure of the second controllable switching element, and consequently the inductor is charged. If the second controllable switching element is opened, the inductor is discharged to the buffer capacitor by way of the diode. By means of a boost converter of said type, the step-up converter is realized using comparatively few components, which results in a comparatively low-cost and robust step-up converter.

In an alternative hereto, the step-up converter comprises an electronic smoothing inductor, which is included in particular in one of the branches of the DC link. The electronic smoothing inductor (ESI) comprises a bridge circuit, two outputs of the bridge circuit being brought into electrical contact with one another by means of a capacitor element, in particular in the form of an electrolytic capacitor. In this arrangement, the step-up converter likewise beneficially comprises an inductor, such as a coil and/or choke, which is beneficially arranged on the side of the bridge circuit facing toward the energy recovery rectifier. In particular, the first controllable switching element is also provided by means of the electronic smoothing inductor, such that all bridge branches of the B4 circuit of the bidirectional electronic smoothing inductor in each case have controllable switching elements that are realized in particular by means of semiconductor switches. During operation, the capacitor element of the electronic smoothing inductor is initially charged by means of actuation of the controllable switching elements, and then, given a change in actuation, is discharged to the buffer capacitor, the electrical voltage being increased in the process.

Preferably, the step-up converter comprises a choke, by means of which an inductance is provided. In this arrangement, the choke serves as a store of electrical energy, which is discharged to the buffer capacitor preferably by means of a suitable switching element in order to increase the electrical voltage. The choke has in particular an inductance between 100 pH and 500 pH. In particular, the inductance is less than 500 pH, 400 pH, 300 pH. A choke of said type is suitably made use of in the case of a power output rating of the energy recovery rectifier device of between 5 kW and 10 kW. A comparatively space-saving step-up converter is realized in this way.

Preferably, the buffer capacitor comprises two buffer capacitor elements connected in series, each of which is implemented as an electrolytic capacitor, for example. Owing to the series circuit, even in the case of a comparatively large DC link voltage, use can be made of capacitor elements having a comparatively low dielectric strength, thus reducing manufacturing costs. The midpoint of said series circuit, i.e. the two electrodes of the buffer capacitors that are electrically contacted to each other, is suitably conducted to ground, in particular capacitively. In other words, the electrical potential formed between the two capacitor elements is capacitively conducted to ground, and in particular is equal to ground. In this way, a further interference suppression of the energy recovery rectifier device is realized, thus achieving a further increase in electromagnetic compatibility.

The method serves for operating an energy recovery rectifier device which is a constituent part of an industrial plant, for example, and which is suitable, preferably provided and configured for being connected to an AC system. The energy recovery rectifier device comprises an energy recovery rectifier and a buffer capacitor connected in parallel with the DC side of the energy recovery rectifier, the AC side of the energy recovery rectifier being electrically contacted to the AC system in the installed state.

The method provides that a current flow between the energy recovery rectifier and the buffer capacitor is reduced at the time of a commutation. Commutation, in this context, refers in particular to the transition of the current flow from one branch of the bridge circuit of the energy recovery rectifier to another of the branches and/or a change in the electrical contacting of a branch of the DC link to one of the phases of the AC system. A switching operation of a rectifier switching element of the energy recovery rectifier is effected for the commutation, for example, one of said rectifier switching elements being opened and another being closed, such that one of the branches of the DC link is electrically contacted to another phase of the AC system in an electrically low impedance manner.

For example, an electrical current flow from the DC side to the buffer capacitor or from the buffer capacitor to the DC side is reduced at the time of the commutation. Preferably, there is a reduction in both a current flow from the DC side to the buffer capacitor and from the buffer capacitor to the DC side at the time of a commutation. In particular, an electrical current flow from the buffer capacitor to the DC side prevails in the case of an energy recovery, the electrical current flow being reduced, for example to 0 A, at the time of the commutation.

Owing to the reduction in the electrical current flow, a comparatively small electrical current is switched at the time of the commutation, thus reducing switching losses. A propagation of oscillations within the AC system is also reduced. The current flow is suitably reduced for a time interval before and a time interval after the time of the commutation, this being effected continuously, for example. A propagation of electrical oscillations is further reduced in this way. For example, the time interval amounts to between 2 ms and 0.01 ms, in particular to between 1 ms and 0.1 ms.

The energy recovery rectifier is beneficially operated at the system frequency. In other words, the rectifier switching elements of the energy recovery rectifier are driven at the same frequency as the AC system. The electrical current flow is beneficially regulated or controlled at a pulse frequency. In other words, the electrical current flow is adjusted, and hence reduced, in a frequency-pulsed manner. A comparatively precise setting of the electrical current flow is made possible in this way. The frequency by means of which the electrical current flow is adjusted in this case amounts, for example, to around 150 kHz.

A DC link voltage present at the buffer capacitor is suitably increased compared to an output voltage present at the energy recovery rectifier on the DC side. In this way, a control or regulation of the electrical current flow from the buffer capacitor to the energy recovery rectifier is possible at all times, irrespective of the current phase angle of the phases of the electrical current of the AC system to which a commutation is currently taking place. In other words, a recovery of energy is also possible even when the phase to which a commutation is currently taking place has the maximum electrical voltage.

In a particularly preferred embodiment variant of the invention, the system-side electrical voltage is monitored and, in the event of a system-side voltage dip, the electrical current flow between the energy recovery rectifier and the buffer capacitor is reduced. By system-side voltage dip is understood in particular a comparatively brief reduction in the electrical voltage of at least one of the phases of the AC system, the electrical voltage deviating from a nominal value by more than a specific threshold value, for example 10 V. In particular, a current flow from the energy recovery rectifier to the buffer capacitor is reduced and as a result no further energy is withdrawn from the AC system. A load imposed on the AC system is reduced in this way. In order nonetheless to be able to maintain a safe and reliable mode of operation, the electrical energy stored inside the buffer capacitor is preferably resorted to. The reduction in the electrical current flow when a system-side voltage dip is present is independent of the reduction in the electrical current flow at the time of the commutation and is considered in particular as an independent invention.

Preferably, the current flow between the energy recovery rectifier and the buffer capacitor, i.e. from the energy recovery rectifier to the buffer capacitor and vice versa, is reduced to a value. This value is the product from a modulation factor and an unreduced current flow between the energy recovery rectifier and the buffer capacitor, i.e. the maximum possible current flow between the energy recovery rectifier and the buffer capacitor which becomes established when there is no regulation and/or adjustment of the electrical current flow. In other words, the unreduced current flow corresponds to the peak value of the electrical current between the energy recovery rectifier and the buffer capacitor. Because of the applied AC voltage, said unreduced current flow is not constant, but fluctuates in an arc-shaped manner between two limits, which are always greater than zero, however. The smallest current flow would in this case occur at the time of a commutation, provided the electrical current flow is not reduced. The greatest value would occur in this case when the electrical voltage of the phase to which the commutation is being effected has the greatest value. In particular, the modulation factor is between zero and one, the modulation factor beneficially being equal to zero at the time of the commutation so that substantially no electrical current flows via the energy recovery rectifier at the time of the commutation. The current flow is suitably regulated or controlled at all times to the product from the modulation factor and the unreduced current flow, the modulation factor preferably having a minimum value at the time of the commutation.

The adjustment of the electrical current flow is simplified owing to the use of a modulation factor, since only the phase angle of the individual phases must be known. If a constant function is resorted to in order to determine the modulation factor, an occurrence of jumps in the electrical current flow is avoided, and therefore a propagation of unwanted oscillations within the AC system is prevented. For example, the modulation factor is calculated on the basis of the electrical voltage of the phases of the AC system, in which case, if several phases are present, the time of the commutation is calculated on the basis of the electrical voltages and a suitable, in particular periodic, function is made use of, by means of which it is ensured that the modulation factor is less than one at the time of the commutation. If the modulation factor is derived on the basis of the electrical voltages, a comparatively robust and error-resistant determination of the modulation factor is provided.

Beneficially, the smaller element from one (1) and the quotient from (DCA−DCAmin) and (DCAmax−DCAmin) is used as the modulation factor. In other words, the modulation factor is equal to $$\min(1; (DCA-DCAmin)/(DCAmax-DCAmin)).$$

In this case, min corresponds to the minimum function, DCA to the unreduced current flow, i.e. the electrical current flow that would become established if there is no control or regulation of the electrical current flow between the energy recovery rectifier and the buffer capacitor. DCAmin corresponds to the unreduced current flow at the time of a commutation, i.e. the electrical current flow that would be switched if no reduction were to take place. The time-averaged unreduced current flow is used as DCAmax, i.e. the current flow that would become established averaged over time between the energy recovery rectifier and the buffer capacitor if no reduction were to be effected at the time of the commutation. In this case the current flow is time-averaged over at least one period of the alternating current. In other words, the length of the time interval used for the time averaging corresponds at least to the length of the period of the alternating current present at the AC side of the energy recovery rectifier, i.e. in particular at least 0.02 sec., if the AC system has a frequency of 50 Hz. An integer multiple of said period is beneficially used.

The unreduced current flow is in this case determined whenever maximum loading of the energy recovery rectifier would prevail, i.e. In particular, when the DC voltage provided in full by means of the energy recovery rectifier were to be withdrawn or the direct current present in full on the DC side were to be fed back into the AC system, i.e. in particular the entire electrical energy present within the buffer capacitor were to be fed back in the shortest possible time, a reduction of the current flow not taking place at the time of the commutation. Determining the modulation factor in this way is comparatively uncomplicated and can be realized without a plurality of sensors or computational rules.

The industrial plant comprises an energy recovery rectifier device for connection to an AC system. By means of the energy recovery rectifier device it is made possible to feed surplus electrical energy back into the AC system. The energy recovery rectifier device comprises an energy recovery rectifier and a buffer capacitor connected in parallel with the DC side of the energy recovery rectifier. A step-up converter is connected between the buffer capacitor and the energy recovery rectifier. Alternatively or in combination herewith, an electrical current flow between the energy recovery rectifier and the buffer capacitor is reduced at the time of a commutation. By means of the energy recovery rectifier device, a formation of oscillations in the AC system is accordingly inhibited even in the case of comparatively large power output ratings owing to a recovery of energy by means of the energy recovery rectifier device. The industrial plant has in particular a power output capacity between 5 kW and 250 kW. The power output capacity of the industrial plant is beneficially greater than 10 kW and less than 200 kW, for example.

The statements made and developments presented in connection with the method for operating the energy recovery rectifier device are to be applied analogously also to the energy recovery rectifier device and the industrial plant, and vice versa.

BRIEF DESCRIPTION OF THE DRAWING

Exemplary embodiments of the invention are explained in more detail with reference to a drawing, in which.

DETAILED DESCRIPTION OF PREFERRED EMBODIMENTS

Parts corresponding to one another are labeled with the same reference signs in all of the figures.

Figure 1:
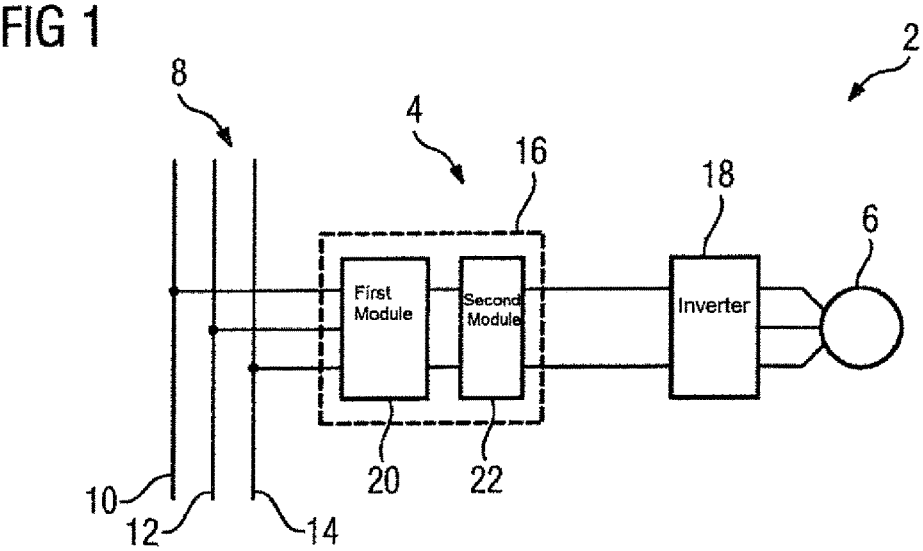
FIG. 1 schematically shows an industrial plant comprising an energy recovery rectifier device.

FIG. 1 shows an industrial plant 2 comprising a power converter 4 having a power output rating greater than 10 kW and equal, for example, to 100 kW. An electric motor 6 is operated by means of the power converter 4. The electric motor 6 serves to drive an actuator (not shown in any further detail) of the industrial plant 2. The power converter 4 is electrically connected between the electric motor 6 and an AC system 8, which has a first phase 10, a second phase 12 and a third phase 14, also designated as L1, L2, L3. Each of the three phases 10, 12, 14 conducts a sinusoidal AC voltage and an alternating current, each at a frequency of 50 Hz, the three phases in each case being offset from one another by 120°. The amplitude of the sinusoidal AC voltage inducing the sinusoidal alternating current is 325 V in each case.

The power converter 4 comprises an energy recovery rectifier device 16 which is in direct electrical contact with the three phases 10, 12, 14 of the AC system 8. The energy recovery rectifier device 16 is therefore connected between the AC system 8 and an inverter 18 of the power converter 4. A direct current provided by means of the energy recovery rectifier device 16 is transformed by means of the inverter 18 into an alternating current which serves for operating the electric motor 6. The alternating current produced by means of the inverter 18 is tailored to the rotational speed and power output of the electric motor 6.

Figure 2:
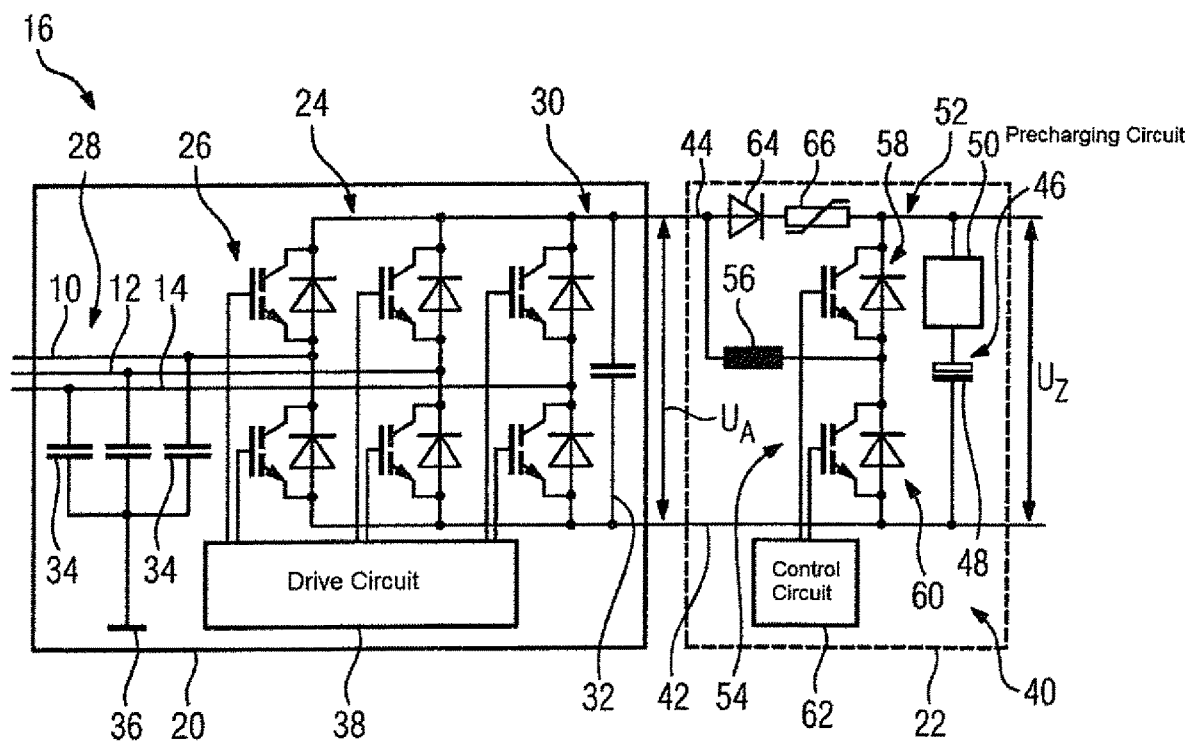
FIG. 2 shows a circuit diagram of a first embodiment variant of the energy recovery rectifier device.

The energy recovery rectifier device 16 comprises a first module 20 and a second module 22, which are illustrated in more detail in FIG. 2. The first module 20 comprises an energy recovery rectifier 24 comprising a B6 circuit. The B6 circuit is produced by means of six rectifier switching elements 26, each of these being a SiC MOSFET with parallel-connected freewheeling diode. In this arrangement, two of the rectifier switching elements 26 in each case are electrically contacted to one of the phases 10, 12, 14, the AC voltage conducted by means of the phases 10, 12, 14 and present on the AC side 28 being rectified by means of the diodes into a DC voltage which is present on a DC side 30 of the energy recovery rectifier 24 and which is equal to an output voltage Ua. The B6 circuit is consequently disposed between the AC side 28 and the DC side 30.

The first module 20 additionally comprises a DC link capacitor 32 having a comparatively small capacitance. On the AC side 28, each of the phases 10, 12, 14 is conducted capacitively to ground 36 in each case by means of a grounding capacitor 34. The first module 20 further comprises a drive circuit 38 by means of which switching signals are applied to the rectifier switching elements 26. This takes place as a function of current demands on the electric motor 6 as well as of the phase angle of the alternating current, or as the case may be, of the AC voltage thereof, conducted by means of the respective phases 10, 12, 14. In this case the switching state of the rectifier switching elements 26 is changed by means of the drive circuit 38, i.e. a forward bias is also made possible in the reverse bias direction of the respective freewheeling diode. This preferably takes place at the system frequency. The first module 20 is beneficially realized by means of a rectifier topology known as F3E, and comprises a comparatively small DC link capacitor 32, i.e. a slimline DC link.

The second module 22 is connected in parallel with the DC link capacitor 32 on the rectifier side 30 and substantially forms a DC link 40 of the power converter 4 with the DC link capacitor 32. The DC link 40 has a negative branch 42 and a positive branch 44, the electrical potential conducted by means of the positive branch 44 being greater than the electrical potential of the negative branch 42. Owing to the freewheeling diodes of the energy recovery rectifier 24 and the grounding capacitors 34, the electrical potential of the negative branch 42 is substantially equal to that of ground 36.

A buffer capacitor 46 is connected between the negative branch 42 and the positive branch 44, and is therefore connected in parallel with the DC side 30 of the energy recovery rectifier 24. In this example, the buffer capacitor 46 has a first electrolytic capacitor 48. The buffer capacitor 46 comprises a precharging circuit 50 by means of which the first electrolytic capacitor 48 can be charged independently of the first module 20. The second module 22 further comprises a step-up converter 52 comprising a boost converter 54 which has a choke 56 with an inductance of 150 pH that is connected into the positive branch 44. A first controllable switching element 58 is connected between the choke 56 and the buffer capacitor 46, and is therefore connected in series with the choke 56. Accordingly, the first controllable switching element 58, which is a SiC MOSFET, is connected between the buffer capacitor 46 and the DC side 30.

One terminal of a second controllable switching element 60 is electrically contacted between the first controllable switching element 58 and the choke 56, its other terminal being electrically contacted to the negative branch 42. The second controllable switching element 60 is identical in construction to the first controllable switching element 58 and, like the latter, also has switching signals applied to it by means of a control circuit 62 comprising a PI controller.

The choke 56 and the first switching element 58 are furthermore bridged by means of a diode 64 and a variable resistor 66 connected in series therewith, the diode 64 and the first controllable switching element 58, which is a bidirectional switching element, inhibiting a current flow from the buffer capacitor 46 to the rectifier side 30 in the open state. During operation, a voltage increase is effected by means of the step-up converter 52, for which reason the output voltage Ua present on the rectifier side 30, which is applied to the DC link capacitor 32, is less than a DC link voltage Uz that is present at the buffer capacitor 46.

During operation of the boost converter 54, the buffer capacitor 46 is initially charged up to the output voltage Ua, the choke 56 likewise being charged at the same time. The first switching element 58 is actuated in such a way that only a current flow from the rectifier side 30 to the buffer capacitor 46 is enabled. In other words, the first switching element 58 is open. Next, the second switching element 60 is actuated in such a way that the positive branch 44 and the negative branch 42 are short-circuited. A current flow occurs as a result, and the choke 56 is charged. As soon as the choke 56 has been charged, the second controllable switching element 60 is opened. This causes the choke 56 to discharge via the first controllable switching element 58 to the buffer capacitor 46, whose voltage is increased as a result.

Figure 3:
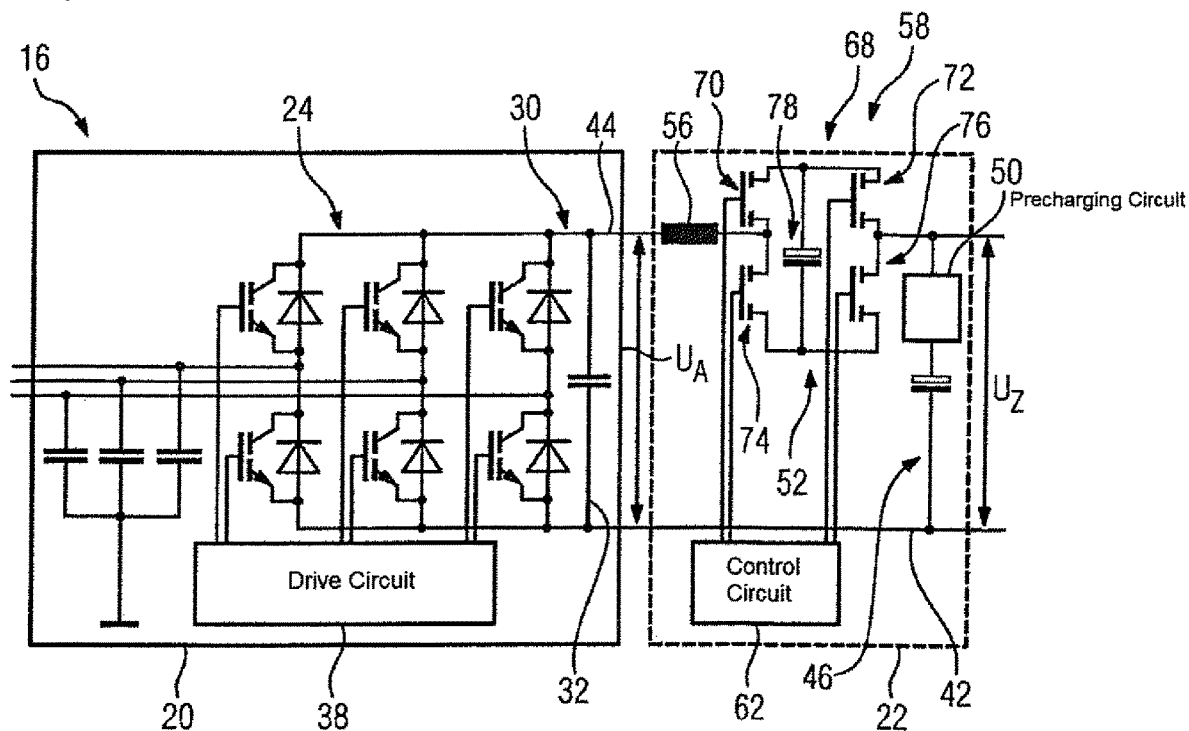
FIG. 3 shows a further embodiment variant of the energy recovery rectifier device according to FIG. 2.

FIG. 3 shows a modified version of the energy recovery rectifier device in which the first module 20 has been left unchanged. The buffer capacitor 46 has also not been changed. Only the step-up converter 52 has been modified and now has, instead of the boost converter 54, a bidirectional electronic smoothing inductor 68 inserted into the positive branch 44 and comprising a B4 circuit which is connected in series with the unchanged choke 56. For the bridge circuit, the electronic smoothing inductor 68 comprises a first semiconductor switch 70 and a second semiconductor switch 72, which are connected in series with one another and in parallel with a third semiconductor switch 74 and a fourth semiconductor switch 76, which are in turn connected in series with one another. The branches of the electronic smoothing inductor 68 produced in this way are electrically contacted to each other by means of a capacitor element 78, one electrode of which is electrically contacted to the first and second semiconductor switches 70, 72 and the remaining electrode of which is electrically contacted to the third and fourth semiconductor switches 74, 76.

Furthermore, the first, second and third semiconductor switches 70, 72, 74, 76 also constitute the first controllable switching element 58 by means of which a current flow between the buffer capacitor 46 and the rectifier side 30 can be adjusted. Switching signals are in turn applied to the semiconductor switches 70, 72, 74, 76 by means of the control circuit 62. In order to generate the DC link voltage Uz that is increased compared to the output voltage Ua, all of the semiconductor switches 70, 72, 74, 76 are for example switched to electrically conducting, which leads to a charging of the choke 56. The capacitor element 78 is not charged in this case. Subsequently thereto, the second and third semiconductor switches 72, 74 are switched to electrically nonconducting, for which reason the capacitor element 78 is charged by means of the diode 74. As soon as the choke 56 has been discharged, the second and third semiconductor switches 72, 74 are switched to conducting and the first and fourth semiconductor switches 70, 76 to nonconducting, whereupon the capacitor element 78 discharges to the buffer capacitor 46, thus leading to the increased DC link voltage Uz.

Figure 4:
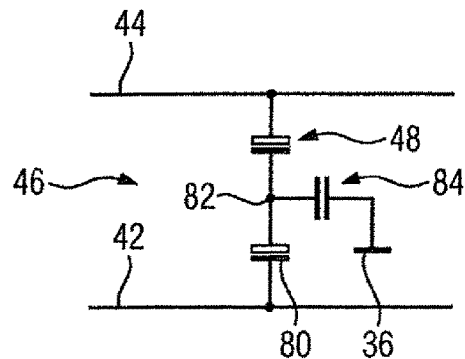
FIG. 4 shows a buffer capacitor of the energy recovery rectifier device.

FIG. 4 illustrates a further embodiment variant of the buffer capacitor 46, without showing the precharging circuit 50, though this may also be present. The buffer capacitor 46 comprises a first electrolytic capacitor 48 and a second electrolytic capacitor 80, which are connected to each other in series and form the buffer capacitor elements of the buffer capacitor 46. Between the two buffer capacitor elements there is formed a midpoint 82, the electrical potential of which therefore corresponds to the electrical potential of one of the electrodes of the two buffer capacitor elements 48, 80 in each case. The midpoint 82 is conducted capacitively to ground 36 by means of a second grounding capacitor 84.

Figure 5:
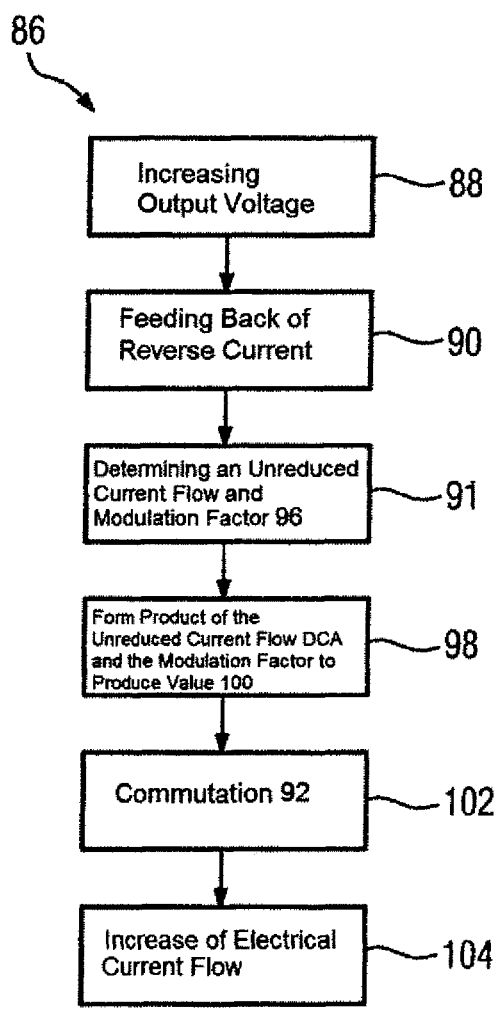
FIG. 5 shows a method for operating an energy recovery rectifier device.

FIG. 5 illustrates a method 86 for operating the energy recovery rectifier device 16. In a first operating step 88, the output voltage Ua present on the rectifier side 30 of the energy recovery rectifier 24 is stepped up by means of the step-up converter 52 to the DC link voltage Uz, for which purpose the electronic smoothing inductor 68 or, as the case may be, the boost converter 54 is suitably driven. The control circuit 62 is beneficially utilized for this. The second controllable switching element 60 or, as the case may be, the semiconductor switches 70, 72, 74, 76 are beneficially driven at a pulse frequency for this purpose.

Figure 6:
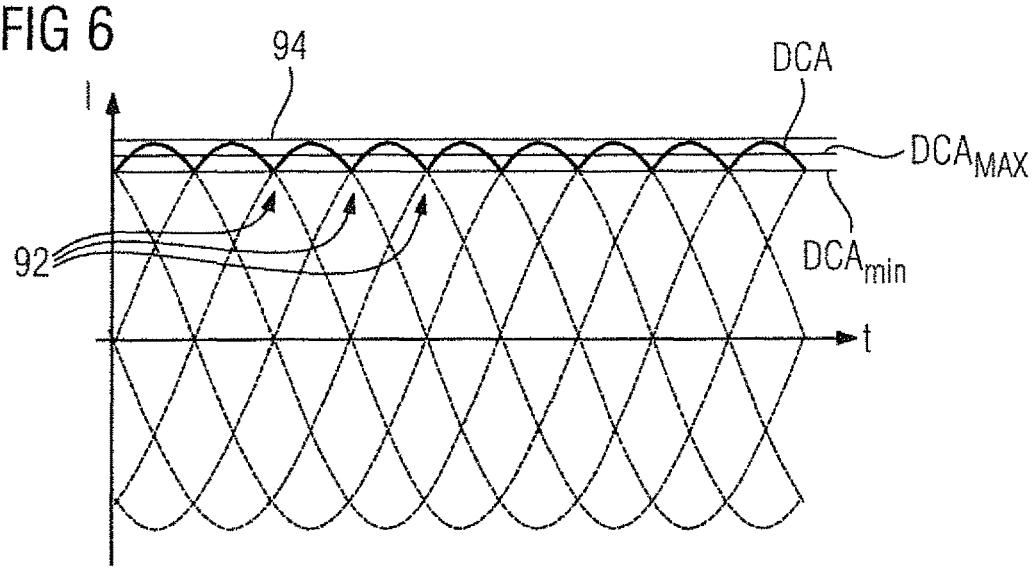
FIG. 6 shows an unreduced current flow within the energy recovery rectifier device.
Figure 7:
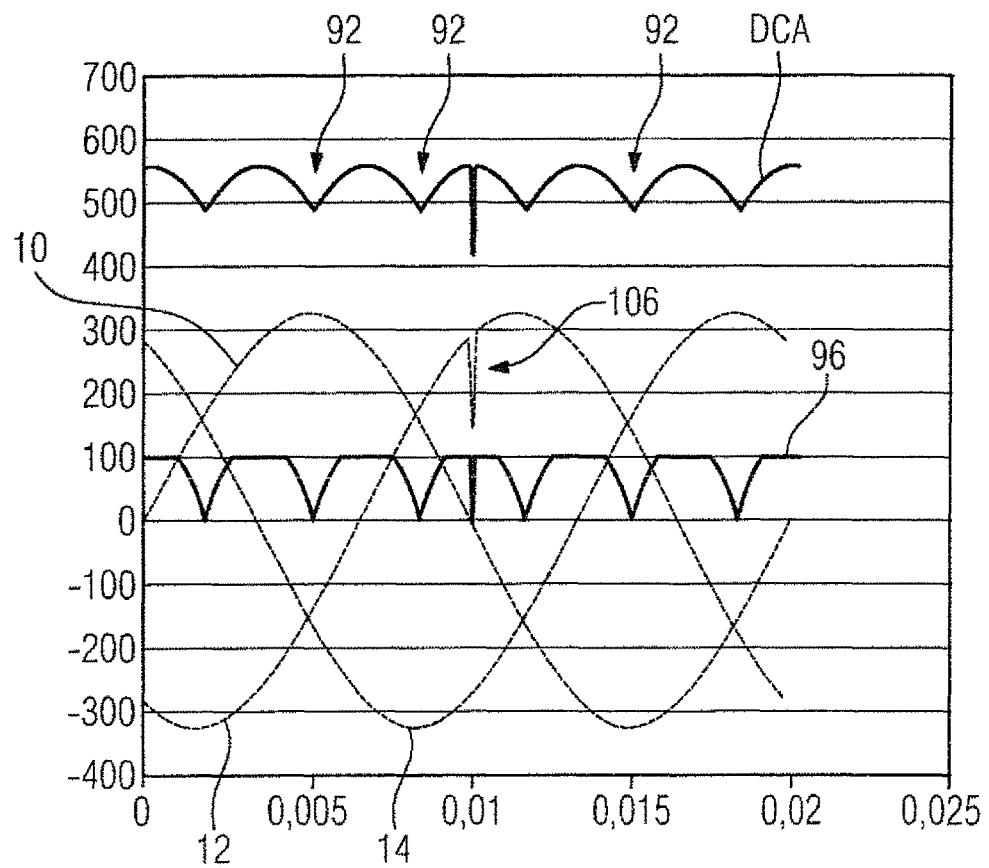
FIG. 7 shows a variation with time both of a modulation factor and of electrical phase voltages and an unreduced current flow.

In an ensuing second operating step 90, it is determined that a reverse current is to be fed back from the buffer capacitor 46 into the AC system 8 by means of the energy recovery rectifier 24. The positive branch 44 and the negative branch 42 are in this case electrically contacted to one of the phases 10, 12, 14 by means of one of the rectifier switching elements 26. In an ensuing third operating step 91, an unreduced current flow DCA is determined, this being represented as a function of time in FIG. 6. The unreduced current flow DCA would be produced if the rectifier switching elements 26 were to be driven in such a way that a hard commutation would take place between the phases 10, 12, 14. In other words, there are formed in each case time instants 92 at which the positive branch 44 or the negative branch 42 is switched over by means of the rectifier switching elements 26 from one of the phases 10, 12, 14 to another of the phases 10, 12, 14, and consequently a low-impedance electrical connection is produced between the same. At the time of the commutation (commutation time instant) 92, an unreduced current flow DCAmin would be present in this case, which would be switched by means of the rectifier switching elements 26, and which could amount to up to 100 amperes. The unreduced current flow DCA consequently runs between the unreduced current flow DCAmin and a peak value 94, the variation with time changing at substantially three times the system frequency of the AC system 8. The time-averaged value of the unreduced current flow DCA is used as DCAmax. A modulation factor 96, shown in FIG. 7, is determined on the basis of the determined current flows DCA, DCAmin, DCAmax. Said modulation factor is determined according to the equation $$\min(1;(DCA-DCAmin)/(DCAmax-DCAmin)),$$

where "min" denotes the minimum function. The modulation factor 96 is therefore always between zero and one.

In an ensuing fourth operating step 98, a value 100 is produced which is the product from the unreduced current flow DCA and the modulation factor 96. The current flow between the buffer capacitor 46 and the rectifier side 30 of the energy recovery rectifier 24 is regulated to said value 100 by means of the control circuit 62, for which purpose the first controllable switching element 58 is suitably driven. The latter is driven in particular in a pulsed frequency mode, which permits a comparatively fine adjustment of the electrical current flow. The frequency used is between 0 kHz and max. 150 kHz.

Provided the current flow is greater than the time-averaged unreduced current flow DCAmax, the first controllable switching element is driven in such a way that there is no reduction in the current flow. In other words, the controllable switching element 58 is disposed in an electrically conducting state. As soon as the unreduced current flow DCA is less than the time-averaged reduced current flow DCAmax, the actual current flow is decreased more strongly by means of the control circuit 62 based on the modulation factor 96, for which purpose a specific pulse frequency is applied to the first controllable switching element 58. In this case the DC link capacitor 32 and the choke 56 exert a smoothing effect, for which reason there is a substantially continuous decrease in the actually flowing electrical current.

In an ensuing fifth operating step 102, the commutation 92 takes place. In this case the rectifier switching elements 26 are controlled by means of the drive circuit 38 in such a way that the previously electrically conducting rectifier switching elements 26 are transitioned into an electrically nonconducting state and two more of the rectifier switching elements 26 are transitioned into an electrically conducting state. On account of the modulation factor 96, the actual current flow at this time instant 92 is 0 A, which means that substantially no switching loss occurs within the energy recovery rectifier 24.

In an ensuing sixth operating step 104, the electrical current flow increases once more because the modulation factor 96 is again greater than zero. The rectifier switching elements 26 are operated at the system frequency during the energy recovery feedback. In other words, changes to the switching states of the rectifier switching elements 26 take place only at the time of the commutation 92. For as long as the recovery of energy persists, the electrical current flow is regulated by means of the control circuit 62 to the value 100, the modulation factor 96 changing accordingly.

If a system-side voltage dip 106 occurs, as shown in FIG. 7 for example, where the second phase 12 experiences a comparatively brief reduction in the electrical voltage, the value 100 is equal to 0 A owing to the unreduced current flow DCA being made use of in order to calculate the modulation factor 96. Accordingly, no electrical energy is extracted from the AC system 8, not even when the buffer capacitor 46 is actually being fed by means of the AC system 8. A loading of the AC system 8 is reduced as a result.

Owing to the use of the modulation factor 96, the power consumption of the energy recovery rectifier device 16 is comparatively low in terms of the load imposed on the AC system 8 since, on the one hand, comparatively low current harmonics are present. On the other hand, owing to a simulated "ohmic" behavior, said system is not subjected to load in the event of a system-side voltage dip 106 being present. An operation of the electric motor 6 is made possible in this case by means of the buffer capacitor 46.

To sum up, the rectifier switching elements 26 of the first module 20 can be optimized for comparatively low conducting state power losses, since these are switched substantially synchronously with the system. The semiconductor switches of the second module 22, in contrast, are clocked at a pulse frequency and are optimized for the lowest possible switching losses. Furthermore, by means of the energy recovery rectifier circuit 16, the DC link voltage Uz to ground 36 changes only at three times the system frequency because the negative branch 42 is conducted to ground 36 by means of the diodes and the grounding capacitors 34. The amplitude of the change is in this case comparatively low and leakage currents are likewise conducted to ground 36.

The invention is not limited to the exemplary embodiments described in the foregoing. Rather, other variants of the invention may also be derived herefrom by the person skilled in the art without leaving the subject matter of the invention. In particular, all individual features described in connection with the individual exemplary embodiments may furthermore also be combined with one another in other ways without departing from the subject matter of the invention.

What is claimed is:

1. A method for operating an energy recovery rectifier device, in particular for an industrial plant, for connection to a three-phase AC system, comprising:
    connecting a buffer capacitor, which comprises a precharging circuit connected in series with a first capacitor, between a step-up converter and the energy recovery rectifier; and
    reducing an electrical current flow between the energy recovery rectifier and the buffer capacitor at a time of a commutation by setting the electrical current flow with a controllable switching element connected between the buffer capacitor and the DC side to a value which is a product of a modulation factor and an unreduced current flow.

2. The method of claim 1, wherein reducing the electrical current flow comprises reducing an electrical current flow from the buffer capacitor to the DC side.

3. The method of claim 2, wherein the electrical current flow from the buffer capacitor to the DC side is reduced to 0 A.

4. The method of claim 1, further comprising increasing a DC link voltage applied at the buffer capacitor compared to an output voltage applied at the energy recovery rectifier on the DC side.

5. The method of claim 1, wherein the electrical current flow between the energy recovery rectifier and the buffer capacitor is reduced in the event of a system-side voltage dip.

6. The method of claim 1, wherein the modulation factor is selected as a smaller value of a value of one (1) and a quotient (DCA−DCAmin)(DCAmax−DCAmin),
    wherein
    DCA corresponds to the unreduced current flow,
    DCAmin corresponds to the unreduced current flow at the time of a commutation, and
    DCAmax corresponds to a time-averaged unreduced current flow.

7. An energy recovery rectifier device, in particular for an industrial plant, for connection to a three-phase AC system, said energy recovery rectifier device comprising:
    an energy recovery rectifier;
    a buffer capacitor comprising a precharging circuit connected in series with a first capacitor; and
    a step-up converter connected between the buffer capacitor and the energy recovery rectifier,
    wherein an electrical current flow between the energy recovery rectifier and the buffer capacitor is reduced at a time of a commutation by setting the electrical current flow with a controllable switching element connected between the buffer capacitor and the DC side to a value which is a product of a modulation factor and an unreduced current flow.

8. The energy recovery rectifier device of claim 7, wherein the controllable switching element is operated at a pulse frequency.

9. The energy recovery rectifier device of claim 7, wherein the step-up converter includes at least one member selected from the group consisting of a boost converter, an electronic smoothing inductor, and a choke having an inductance between 100 µH and 500 µH.

10. The energy recovery rectifier device of claim 7, wherein the buffer capacitor includes two buffer capacitor elements connected in series, with a midpoint between the two buffer capacitor elements being capacitively coupled to ground.

11. An industrial plant, comprising an energy recovery rectifier device including an energy recovery rectifier for connection to a three-phase AC system, a buffer capacitor comprising a precharging circuit connected in series with a first capacitor, and a step-up converter connected between the buffer capacitor and the energy recovery rectifier, wherein an electrical current flow between the energy recovery rectifier and the buffer capacitor is reduced at a time of a commutation by setting the electrical current flow with a controllable switching element connected between the buffer capacitor and the DC side to a value which is a product of a modulation factor and an unreduced current flow, said industrial plant; having a power output between 5 kW and 250 kW.

12. The industrial plant of claim 11, having a power output between 10 kW and 200 kW.

\* \* \* \* \*